(12) United States Patent
Hatakeyama et al.

(10) Patent No.: US 9,663,635 B2
(45) Date of Patent: May 30, 2017

(54) ALUMINUM NITRIDE POWDER, RESIN COMPOSITION, AND THERMALLY CONDUCTIVE MOLDED OBJECT

(71) Applicants: NITTO DENKO CORPORATION, Ibaraki-shi, Osaka (JP); NITTO SHINKO CORPORATION, Sakai-shi, Fukui (JP)

(72) Inventors: Yoshiharu Hatakeyama, Ibaraki (JP); Kenichi Fujikawa, Ibaraki (JP); Miho Yamaguchi, Ibaraki (JP); Yuji Yamagishi, Sakai (JP); Akihiro Oohashi, Sakai (JP)

(73) Assignees: NITTO DENKO CORPORATION, Osaka (JP); NITTO SHINKO CORPORATION, Fukui (JP)

( * ) Notice: Subject to any disclaimer, the term of this patent is extended or adjusted under 35 U.S.C. 154(b) by 0 days.

(21) Appl. No.: 15/123,299

(22) PCT Filed: Dec. 16, 2014

(86) PCT No.: PCT/JP2014/083292
§ 371 (c)(1),
(2) Date: Sep. 2, 2016

(87) PCT Pub. No.: WO2015/133037
PCT Pub. Date: Sep. 11, 2015

(65) Prior Publication Data
US 2017/0066908 A1 Mar. 9, 2017

(30) Foreign Application Priority Data

Mar. 4, 2014 (JP) .................................. 2014-041602

(51) Int. Cl.
| | | |
|---|---|---|
| C08K 9/00 | (2006.01) | |
| C08K 9/04 | (2006.01) | |
| C01B 21/072 | (2006.01) | |
| C08K 3/28 | (2006.01) | |
| C09K 5/14 | (2006.01) | |

(52) U.S. Cl.
CPC .............. *C08K 9/04* (2013.01); *C01B 21/072* (2013.01); *C08K 3/28* (2013.01); *C09K 5/14* (2013.01); *C08K 2003/282* (2013.01)

(58) Field of Classification Search
CPC .......... C09K 5/14; C09K 252/74; C08K 3/28; C08K 2003/282; C08J 51/18; C08J 2363/00
See application file for complete search history.

(56) References Cited

U.S. PATENT DOCUMENTS

| | | | | |
|---|---|---|---|---|
| 4,923,689 | A * | 5/1990 | Uenishi ............... | C01B 21/0728 423/267 |
| 5,352,424 | A * | 10/1994 | Howard .............. | C01B 21/0728 252/181.3 |
| 2003/0011850 | A1* | 1/2003 | Sidorovich ............ | G02B 27/48 398/126 |
| 2007/0149834 | A1* | 6/2007 | Endo ....................... | C08L 83/04 585/7 |
| 2012/0258310 | A1* | 10/2012 | Watanabe ............. | C01B 21/072 428/402 |
| 2014/0061530 | A1* | 3/2014 | Ohno .................. | C01B 21/0728 252/75 |
| 2015/0225238 | A1* | 8/2015 | Tamagaki ........... | C01B 21/0728 423/412 |

FOREIGN PATENT DOCUMENTS

| | | |
|---|---|---|
| JP | 02-141409 A | 5/1990 |
| JP | 02-141410 A | 5/1990 |
| JP | 07-315813 A | 12/1995 |
| JP | 09-031356 A | 2/1997 |
| JP | 09-202608 A | 8/1997 |
| JP | 09-221306 A | 8/1997 |
| JP | 10-324510 A | 12/1998 |
| WO | 2012/147999 A1 | 11/2012 |

OTHER PUBLICATIONS

International Search Report for PCT/JP2014/083292 dated Mar. 31, 2015 [PCT/ISA/210].
Written Opinion for PCT/JP2014/083292 dated Mar. 31, 2015 [PCT/ISA/237].

* cited by examiner

*Primary Examiner* — Hannah Pak
(74) *Attorney, Agent, or Firm* — Sughrue Mion, PLLC

(57) ABSTRACT

The present invention provides, as an aluminum nitride powder excellent in the water resistance, an aluminum nitride powder subjected to a surface treatment with a predetermined organic compound. The present invention also provides a resin composition including the aluminum nitride powder and a resin, and a thermal conductive molded article obtained by molding the resin composition.

6 Claims, No Drawings

ALUMINUM NITRIDE POWDER, RESIN COMPOSITION, AND THERMALLY CONDUCTIVE MOLDED OBJECT

TECHNICAL FIELD

The present invention relates to an aluminum nitride powder, a resin composition including the aluminum nitride powder, and a thermal conductive molded article obtained by molding the resin composition.

BACKGROUND ART

In recent years, with respect to an electronic device, etc., demands for space saving of the installation place and weight reduction are increasing. In addition, along with an increase in the localization of a control mechanism or the cloud utilization, the demand for smaller size and higher performance of an electronic device is growing. Consequently, the quantity of heat generated from the device is increased, and it is required to develop a thermal conductive element more excellent in the thermal conductivity. For example, a thermal conductive element is used in the technical field of a semiconductor device employed for, e.g., a high-brightness LED, a personal computer, an automotive motor control mechanism, or a device utilizing power electronic technology of converting and controlling electric power.

The thermal conductive element is used around an electronic component and therefore, is required to have high insulating property in addition to high thermal conductivity.

From such a viewpoint, a thermal conductive sheet containing a resin and an aluminum nitride powder is used as a thermal conductive element exhibiting high thermal conductivity and high insulating property.

However, the conventional thermal conductive sheet has a problem that when it is used in a wet environment, aluminum nitride reacts with water to generate aluminum hydroxide, whereby the thermal conductivity is reduced, or a problem that ammonium ion is also produced by the above-described reaction and ion migration is caused by the ammonium ion, as a result, the insulating property is reduced.

From such a viewpoint, there have been proposed, for example, an aluminum nitride powder subjected to a surface treatment with an inorganic phosphoric acid compound (Patent Document 1), an aluminum nitride powder subjected to a surface treatment with an organic phosphoric acid compound and then subjected to a heat treatment at a temperature of approximately from 150 to 800° C. (Patent Document 2), and an aluminum nitride powder subjected to a surface treatment with an organic silicon compound at a high temperature (Patent Document 3).

BACKGROUND ART DOCUMENT

Patent Document

Patent Document 1: JP-A-2-141409
Patent Document 2: JP-A-2-141410
Patent Document 3: JP-A-7-315813

SUMMARY OF THE INVENTION

Problems that the Invention is to Solve

However, the aluminum nitride powders of Patent Documents 1 and 2 have a problem that the water resistance cannot be maintained in a high-temperature high-humidity environment.

The aluminum nitride powder of Patent Document 3 is obtained through a surface treatment at a high temperature and therefore, has a problem that particles aggregate to produce a large lump or a problem that when n the lump is crushed, aluminum nitride appears on the surface and the water resistance cannot be maintained.

In consideration of these problems, a first object of the present invention is to provide an aluminum nitride powder excellent in the water resistance; a second object of the present invention is to provide a resin composition including an aluminum nitride powder excellent in the water resistance; and a third object of the present invention is to provide a thermal conductive molded article excellent in the water resistance.

Means for Solving the Problems

The present invention relates to an aluminum nitride powder subjected to a surface treatment with an organic compound represented by the following formula (1):

[Chem. 1]

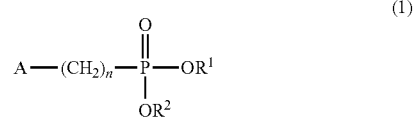

in which A is a hydrogen atom, a hydroxy group or an ester group, n is an integer of 9 or more, $R^1$ is an alkyl group or a hydrogen atom, and $R^2$ is an alkyl group or a hydrogen atom.

The aluminum nitride powder described above can be excellent in the water resistance by virtue of chemical bonding of the organic compound represented by the formula (1) to aluminum nitride.

In addition, the present invention relates to a resin composition including: the aluminum nitride powder described above; and a resin.

Furthermore, the present invention relates to a thermal conductive molded article obtained by molding the resin composition described above.

Advantage of the Invention

As described above, according to the present invention, an aluminum nitride powder excellent in the water resistance can be provided. In addition, a resin composition including an aluminum nitride powder excellent in the water resistance can be provided. Furthermore, a thermal conductive molded article excellent in the water resistance can be provided.

MODE FOR CARRYING OUT THE INVENTION

One embodiment of the present invention is described below.

The aluminum nitride powder in this embodiment is an aluminum nitride powder subjected to a surface treatment with an organic compound represented by the following formula (1):

[Chem. 2]

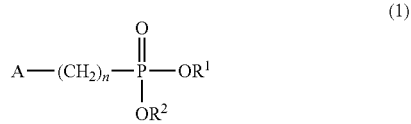

in which A is a hydrogen atom, a hydroxy group or an ester group, n is an integer of 9 or more, $R^1$ is an alkyl group or a hydrogen atom, and $R^2$ is an alkyl group or a hydrogen atom.

The aluminum nitride powder in this embodiment is subjected to a surface treatment with an organic compound represented by the formula (1), whereby the hydrophobicity is increased.

The aluminum nitride powder to be subjected to the surface treatment described above hereinafter, sometimes referred to as "raw material powder") include those obtained by conventionally known methods. Examples of the raw material powder include an aluminum nitride powder obtained by a method such as a direct nitridation method of nitriding a metallic aluminum powder in a high-temperature nitrogen atmosphere, a reduction nitridation method of reducing/nitriding a mixed powder of alumina powder and carbon powder in a high-temperature nitrogen atmosphere, and a gas-phase reaction method of causing a gas-phase reaction of an organic aluminum gas with a nitrogen-containing gas (e.g. ammonia gas). In addition, an aluminum nitride powder obtained by crushing a lump of aluminum nitride may also be used as the raw material powder.

The raw material powder may be a polycrystalline powder or a monocrystalline powder.

Furthermore, the raw material powder may also be a sintered article. Accordingly, the raw material powder may contain other elements as impurities, in addition to aluminum nitride. The impurity elements include, other than Al element and N element forming aluminum nitride, Y element, B element, Fe element, Si element, Ca element, Mg element, Ti element, Cr element, Cu element, Ni element, Na element, Cl element, and C element. The impurity elements also include N element, Al element, O element and H element constituting $Al_2O_3$, $Al(OH)_3$, etc. other than aluminum nitride. In the raw material powder, the content of each element contained as an impurity is preferably 0.1 mass % or less.

The aluminum nitride particle of the raw material powder may also contain a hydrate of aluminum nitride on the surface thereof. In addition, the aluminum nitride particle may contain an oxide or a hydroxide on the surface thereof.

With respect to the morphology of the aluminum nitride particle, spherical (including completely spherical), polyhedral particulate, needle-like, amorphous, plate-like, etc. may be mentioned, but is not limited thereto.

From the viewpoint of making it easy to increase the filling factor of aluminum nitride in the resin composition or thermal conductive molded article which will be described later, a spherical or polyhedral particulate aluminum nitride particle is preferred. From the viewpoint of increasing the thermal conductivity of the thermal conductive molded article which will be described later, a plate-like aluminum nitride particle is preferred.

The morphology of the aluminum nitride particle can be confirmed by an image analytical method. For example, the morphology of the aluminum nitride particle can be confirmed using a particle image analyzer, Morphologi G3 (manufactured by Spectris Co., Ltd.).

The volume average diameter of the aluminum nitride particle is not particularly limited but is preferably 0.1 μm or more from the viewpoint of increasing the thermal conductivity of the thermal conductive molded article which will be described later, and is preferably 300 μm or less in view of use as a filler for a sheet-like thermal conductive molded article (thermal conductive sheet). The volume average diameter thereof is more preferably from 0.2 to 200 μm, still more preferably from 1 to 100 μm, yet still more preferably from 5 to 80 μm.

The volume average diameter of the aluminum nitride particle can be measured by a laser diffraction/scattering method and, for example, can be measured using a laser diffraction-type particle size distribution measuring apparatus (SALD-2100, SHIMADZU).

In the organic compound represented by the formula (1) to be used for the surface treatment described above, n is preferably an integer of 9 to 18, more preferably an integer of 10 to 18.

The organic compound represented by the formula (1) preferably has a structure of the following formula (2) at the time of surface treatment of the raw material powder. That is, it is preferred that both $R^1$ and $R^2$ of the organic compound represented by the formula (1) are a hydrogen atom.

Since the organic compound represented by the formula (1) is sufficient if it comes to have a phosphate group due to hydrolysis, etc. when surface-treating the aluminum nitride powder with the organic compound represented by the formula (1), $R^1$ may be an alkyl group or $R^2$ may be an alkyl group. In the case where $R^1$ is an alkyl group, examples of $R^1$ include a methyl group and an ethyl group. In the case where $R^2$ is an alkyl group, examples of $R^2$ include a methyl group and an ethyl group.

[Chem. 3]

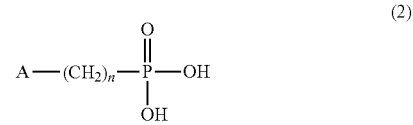

For example, the aluminum nitride powder of this embodiment can be obtained by subjecting the raw material powder and an organic compound represented by the formula (1) to a solvothermal treatment.

Specifically, the aluminum nitride powder of this embodiment can be obtained by subjecting the raw material powder and an organic compound represented by the formula (1) to a solvothermal treatment in the presence of a solvent under high-temperature high-pressure conditions.

As the solvent to be used in the solvothermal treatment, water, ethanol, etc. may be mentioned.

As the solvent, water is preferably used.

With respect to the blending ratio in the solvothermal treatment, the total amount of the organic compound represented by the formula (1) is, for example, from 0.1 to 500 parts by mass, preferably from 1 to 100 parts by mass, more preferably from 5 to 25 parts by mass, per 100 parts by mass of the raw material powder. The amount of the solvent is, for example, from 0.01 to 1,000 parts by mass, preferably from 0.1 to 500 parts by mass, more preferably from 1 to 400 parts by mass, per 100 parts by mass of the raw material powder.

Since the density of the organic compound represented by the formula (1) is usually from 0.8 to 1.1 g/mL, the blending ratio of the total amount of the organic compound represented by the formula (1) is, for example, from 0.08 to 550 mL, preferably from 0.8 to 110 mL, more preferably from 4 to 27.5 mL, relative to 100 g of the raw material powder. In the case of using water as the solvent in the solvothermal treatment, since the density of water is usually about 1 g/mL, the blending ratio of water is, for example, from 0.01 to 1,000 mL, preferably from 0.1 to 500 mL, more preferably from 1 to 400 mL, relative to 100 g of the raw material powder.

With respect to the treatment conditions in the solvothermal treatment, the heating temperature is, for example, from 250 to 500° C., preferably from 300 to 400° C.

The pressure is, for example, from 0.2 to 50 MPa, preferably from 1 to 45 MPa, more preferably from 1.5 to 40 MPa.

In the case of performing the solvothermal treatment in a batch system, the treatment tune is, for example, from 1 to 1,200 minutes, preferably from 3 to 500 minutes, in the case of performing the solvothermal treatment in a continuous system, the treatment time may be 1 minute or less.

The reaction product obtained by the solvothermal treatment contains a solvent and the aluminum nitride powder of this embodiment, The method for separating the solvent from the aluminum nitride powder of the present invention includes, for example, a method of settling and separating the reaction product by a gravitational or centrifugal force.

Since the reaction product also contains an unreacted organic compound represented by the formula (1), it is preferred that the reaction product and a cleaning solution are mixed to dissolve the unreacted organic compound represented by the formula (1) into the cleaning solution, and the unreacted organic compound represented by the formula (1) is removed together with the cleaning solution so as to recover the aluminum nitride powder of this embodiment.

Examples of the cleaning solution include an alcohol (e.g., methanol, ethanol, propanol, isopropanol), a ketone (e.g., acetone, methyl ethyl ketone, cyclohexanone, cyclopentanone), an aliphatic hydrocarbon (e.g., pentane, hexane, cyclopentanone), a halogenated aliphatic hydrocarbon (e.g., dichloromethane, chloroform, trichloroethane), a halogenated aromatic hydrocarbon (e.g., chlorobenzene, dichlorobenzene (specifically, ortho-dichlorobenzene)), an ether (e.g., tetrahydrofuran), an aromatic hydrocarbon benzene, toluene, xylene), a nitrogen-containing compound (e.g., N-methylpyrrolidone (NMP), pyridine, acetonitrile, dimethylformamide), and an aprotic solvent (e.g., dimethylsulfoxide (DMS), dimethylformamide).

The cleaning solution is not limited only to the above-described organic solvents but also includes an aqueous solvent. As the aqueous solvent, a pH-adjusting aqueous solution (e.g., ammonia water) may be mentioned.

The cleaning solution is preferably an alcohol.

Removal of the cleaning solution can be achieved, for example, by performing filtration or decantation. If desired, the reaction product after filtration or decantation may be dried by heating or air blowing.

The aluminum nitride powder of this embodiment obtained in this way is excellent in the water resistance.

With respect to the organic compound represented by the formula (1) to be used for the surface treatment of the aluminum nitride powder, in the case of using two or more organic compounds represented by the formula (1), after mixing of two or more organic compounds represented by the formula (1), the surface treatment of the aluminum nitride powder may be performed using the mixture, or the surface treatments of the aluminum nitride powder with those organic compounds may be performed separately.

In this embodiment, as long as the technical effects of this embodiment are obtained, a surface treatment with a surface treating agent other than the organic compound represented by the formula (1) may be further performed, in addition to the surface treatment with the organic compound represented by the formula (1).

The reaction product adhering to a vessel, etc. used in the process of solvothermal treatment, washing and drying is preferably recovered, for example, by means of a scraper (e.g., spatula).

The resin composition of this embodiment is described below.

The resin composition of this embodiment includes the aluminum nitride powder of this embodiment and a resin.

The resin is not particularly limited, and examples thereof include a thermosetting resin and a thermoplastic resin.

Examples of the thermosetting resin include polycarbonate resin, epoxy resin, thermosetting imide resin, phenol resin, phenoxy resin, urea resin, melamine resin, diallyl phthalate resin, silicone resin, and thermosetting urethane resin.

Examples of the thermoplastic resin include thermoplastic fluororesin, olefin resin, acrylic resin, polystyrene resin, polyester resin, polyacrylonitrile resin, maleimide resin, polyvinyl acetate resin, polyethylene resin, an ethylene/vinyl acetate copolymer, polyvinyl alcohol resin, polyamide resin, polyvinyl chloride resin, polyacetal resin, polyphenylene oxide resin, polyphenylene sulfide resin, polyether ether ketone resin (PEEK), polyallylsulfone resin, thermoplastic polyimide resin, thermoplastic urethane resin, polyetherimide resin, polymethylpentene resin, cellulose resin, and a liquid crystal polymer.

Examples of the thermoplastic resin also include a synthetic rubber (e.g., styrene/butadiene rubber, fluororubber).

One of the above-described resins may be used alone, or two or more thereof may be used in combination.

From the viewpoint of increasing the thermal conductivity, the resin described above is preferably a resin having a liquid crystalline ordered structure (for example, a mesogen group-containing resin).

From the viewpoint of increasing the adhesiveness, the resin described above is preferably epoxy resin or phenol resin.

From the viewpoint of dispersing the aluminum nitride powder of this embodiment in the resin described above, the resin composition of this embodiment is preferably obtained by mixing the powdered aluminum nitride of this embodiment with the resin.

The mixing can be performed, for example, by stirring or shaking the aluminum nitride powder of this embodiment and the resin. The stirring can be performed by a known stirring method where a shear force is applied to the aluminum nitride powder of this embodiment and the resin by using a mill (e.g., ball mill, roll mill), a kneading machine (e.g., kneader, roll), a mortar, etc. The aluminum nitride powder of this embodiment and the resin are stirred, and the stirring may be performed using a stirring/defoaming machine (e.g., hybrid mixer) so as to remove air bubbles from the resin composition obtained.

The blending ratio of the aluminum nitride powder of this embodiment at the time of production of the resin composition is, for example, from 10 to 4,900 parts by mass, preferably from 100 to 2,400 parts by mass, more preferably from 300 to 1,500 parts by mass, per 100 parts by mass of the resin. In other words, the resin composition may be produced by mixing the aluminum nitride powder of this embodiment and the resin such that the concentration of the aluminum nitride powder of this embodiment in a thermal conductive molded article becomes, for example, from 9 to 98 mass %, preferably from 50 to 96 mass %, more preferably from 75 to 94 mass %.

From the viewpoint of enhancing the handling property, a solvent may be incorporated into the resin composition of this embodiment to form varnish The solvent is not particularly limited and examples thereof include the above-described cleaning solutions. Other examples thereof include an alicyclic hydrocarbon (e.g., cyclopentane, cyclohexane), an ester (e.g., ethyl acetate), a polyol (e.g., ethylene glycol, glycerin), an acrylic monomer (e.g., isostearyl acrylate, lauryl acrylate, isobornyl acrylate, butyl acrylate, methacrylate, acrylic acid, tetrahydrofurfuryl acrylate, 1,6-hexanediol diacrylate, 2-hydroxyethyl acrylate, 4-hydroxybutyl acrylate, phenoxyethyl acrylate, acryloylmorpholine), a vinyl group-containing monomer (e.g., styrene, ethylene), and a bisphenol A epoxy resin. One of these solvents may be used alone, or two or more thereof may be used in combination.

The blending ratio of the solvent at the time of production of the resin composition is, for example, from 30 to 1,900 parts by mass, preferably from 50 to 900 parts by mass, more preferably from 100 to 500 parts by mass, per 100 parts by mass of the resin.

In the case where the resin is liquid at normal temperature and normal pressure (25° C., 1 atm.) or where the resin melts by heating, the solvent described above may not be incorporated into the resin composition of this embodiment.

The thermal conductive molded article of this embodiment is described below.

The thermal conductive molded article of this embodiment is obtained by molding the resin composition described above, The thermal conductive molded article of this embodiment may be a thermal conductive molded article obtained by molding the resin composition into a sheet shape (i.e., thermal conductive sheet).

The thickness of the thermal conductive sheet is appropriately set according to uses and purposes thereof but is, for example, from 1 to 1,000 μm, preferably from 10 to 600 μm, more preferably from 30 to 400 μm.

In the case where the resin contained in the resin composition is a thermoplastic resin, the thermal conductive sheet can be produced as follows. First, the thermoplastic resin is melted by heating the resin composition. The heating temperature is, for example, from 100 to 350° C. Next, the molten resin composition is applied onto a known support plate to form a coating film. The coating film is then cured by cooling, whereby the thermal conductive sheet can be produced.

In the case where the resin contained in the resin composition is a thermosetting resin, the thermal conductive sheet can be produced as follows. First, the thermosetting resin is softened by heating the resin composition. The heating temperature is a temperature for providing a semi-cured state (B-stage state) and is, for example, from 60 to 150° C. Next, the softened resin composition is applied onto a known support plate to form a coating film. The coating film is then cured, whereby the thermal conductive sheet can be produced.

Furthermore, in the case where the resin composition contains the solvent described above, a coating film is formed by applying the resin composition onto a known support plate, and the solvent is then volatilized to cure the coating film, whereby the thermal conductive sheet can be produced. At the time of volatilization of the solvent, the coating film may be heated.

Examples of the application method include a known application method such as spin coater method and bar coater method, and also include manual application using a known applicator.

The viscosity of the resin composition can be appropriately adjusted by volatilizing the solvent in the resin composition using an evaporator, etc. at the time of application.

In addition, the thermal conductive molded article of this embodiment can be obtained by molding the resin composition using a molding machine (for example, a pressing machine, a kneader, or an extruder).

The thermal conductive molded article of this embodiment can also be molded as a thermal conductive block through thermoforming such as thermal pressing by putting the resin composition into a die.

The aluminum nitride powder, the resin composition and the thermal conductive molded article of this embodiment are configured as above and therefore, have the following advantages.

The aluminum nitride powder of this embodiment is an aluminum nitride powder subjected to a surface treatment with an organic compound represented by the formula (1) and therefore, is excellent in the water resistance.

Consequently, in the aluminum nitride powder of this embodiment, the electrical conductivity in the water resistance test which will be described later, can be, for example, 100 μS/cm or less, and the pH can be, for example, from 5 to 9.

The aluminum nitride powder of this embodiment hardly allows for change of aluminum nitride to aluminum hydroxide, etc. and therefore, is excellent in the thermal conductivity.

The thermal conductive molded article of this embodiment includes the aluminum nitride powder of this embodiment and therefore, is excellent in the water resistance and furthermore, excellent in the thermal conductivity.

The thermal conductive sheet that is the thermal conductive molded article having a sheet shape has excellent water resistance and furthermore, excellent thermal conductivity and therefore, is suitably used, for example, as a thermal conductive sheet provided between CPU and fins or as a thermal conductive sheet of a power module utilized in an inverter, etc. of an electric vehicle.

In addition, the thermal conductive molded article described above can be used, for example, in an application for dissipating heat from an electronic device, in an application for dissipating heat from transportation equipment (e.g., automobile, electric train), in an application for dissipating heat from an inverter employed when converting natural energy to electrical energy, and in an application for dissipating heat from LED (light-emitting diode) (e.g., OILED (organic light-emitting diode)) employed for lighting.

The aluminum nitride powder, the resin composition and the thermal conductive molded article of this embodiment have the above-described advantages due to the configurations described above, but the aluminum nitride powder, the resin composition and the thermal conductive molded article of this embodiment are not limited to such configurations, and their designs can be appropriately changed.

EXAMPLES

The present invention is described more specifically below by referring to Examples and Comparative Examples.
(Evaluation of Water Resistance)
(1) Preparation of Sample 0.75 g of the aluminum nitride powder of each of Examples and Comparative Examples described later and 15 g of ion-exchanged water (ionic conductivity: 1 μΩ/cm² or less) were put in a 50 mL centrifuge tube, and the centrifuge tube was left standing for 20 hours in a dryer at 95° C. The liquid in the centrifuge tube was then separated into a supernatant and a precipitate by centrifuging the liquid in the centrifuge tube by means of a centrifuge (trade name: MX-301, manufactured by Tomy Seiko Co., Ltd.) at 5,000 G for 10 minutes, and the supernatant was used as a sample solution for electric conductivity (EC) measurement and as a sample solution for pH measurement.

(2) Measurement of Electric Conductivity

The electric conductivity of the sample solution for electric conductivity (EC) measurement was measured using an electric conductivity meter (SevenGo SG3: manufactured by METLER TOLEDO).

The measured value was evaluated according to the following criteria.

AA: In the case where the electric conductivity is 50 μS/cm or less.

A: In the case where the electric conductivity is more than 50 μS/cm and 100 μS/cm or less.

B: In the case where the electric conductivity is more than 100 μS/cm and 200 μS/cm or less.

C: In the case where the electric conductivity is more than 200 μS/cm.

(3) Measurement of pH

The pH of the sample solution for pH measurement was measured using a pH meter (body: F-51, electrode: 9625, manufactured by HORIBA, Ltd.).

The measured value was evaluated according to the following criteria.

AA: In the case where the pH is from 6 to 8.

A: In the case where the pH is 5 or more and less than 6, or more than 8 and 9 or less.

C: In the case where the pH is less than 5 or more than 9,

Examples 1 to 16

An aluminum nitride powder, a surface treating agent and ion-exchanged water were put in a 5 ml, high-pressure reactor (SHR-R6-500, manufactured by AKICO Corporation) according to the formulation in Table 1 using the surface treating agent shown in Table 1. Incidentally, the chemical formula of the surface treating agent used in Example 14 is shown in the following formula (3).

After closing, the high-pressure reactor with a cover, the high-pressure reactor was placed in a shaking heating furnace (manufactured by AKICO Corporation) and heated under conditions of the temperature and the time shown in "Heating Conditions" of Table 1. The pressure in the high-pressure reactor at the time of heating was determined as follows. A volume obtained by subtracting the volume of the powder portion from the volume in the high-pressure reactor is taken as the volume of a space where ion-exchanged water can be present, and the pressure in the high-pressure reactor was calculated based on the volume of the space described above, the mass of the ion-exchanged water charged into the high-pressure reaction vessel, the temperature in the high-pressure reactor, and the pure water equation (see NIST Chemistry WebBook).

Thereafter, the high-pressure reactor was rapidly cooled in normal temperature water (from 15 to 40° C.).

The contents (reaction product) in the high-pressure reactor were scraped with a spatula and transferred to a centrifuge tube to recover the contents. At this time, an operation of adding a small amount of ethanol to the high-pressure reactor and flushing out the contents adhering to the inner wall of the high-pressure reactor with ethanol into the centrifuge tube was repeated a plurality of times. The total amount of ethanol used for flushing out the contents was about 20 mL (20 mL of ethanol, relative to 1 g of the raw material powder).

Subsequently, an ethanol washing step (first washing step) and an ion-exchanged water washing step (second washing step) were carried out the number of times shown in Table 1. In the ethanol washing step, the total weight of the centrifuge tube and the contents in the centrifuge tube was adjusted to 33 g by charging about 20 mL of ethanol (about 20 mL of ethanol, relative to 1 g of aluminum nitride before surface treatment) into the centrifuge tube containing the reaction product. The contents in the centrifuge tube were stirred, and the centrifuge tube was set in a centrifuge (trade name: MX-301, manufactured by Tomy Seiko Co., Ltd.). The contents in the centrifuge tube were centrifuged at 5,000 G for 10 minutes, thereby being separated into a precipitate (reaction product) and a supernatant, and the supernatant was removed from the centrifuge tube. In the ion-exchanged water washing step, ion-exchanged water was used in place of ethanol. Here, in the ion-exchanged water washing step, the total weight of the centrifuge tube and the contents in the centrifuge tube was adjusted to 37 g.

The precipitate was heated at 120° C. for one hour to remove ethanol or water, whereby a surface-treated aluminum nitride powder was obtained.

The surface-treated aluminum nitride powder was then subjected to a water resistance evaluation test.

TABLE 1

| | Aluminum Nitride Powder | | Surface Treatment | | | |
| --- | --- | --- | --- | --- | --- | --- |
| | | | | Formulation | | |
| | | | | | Surface Treating Agent | Ion-Exchanged Water |
| | Article Number | Average Particle Diameter μm | Method | Kind | Amount* g/1 g-AlN | Amount* g/1 g-AlN |
| Example 1 | FAN-f50j | 50 | solvothermal treatment | diethyl decylphosphonate | 0.25 | 0.103 |

TABLE 1-continued

| | | | | | | |
|---|---|---|---|---|---|---|
| Example 2 | FAN-f80 | 80 | solvothermal treatment | decylphosphonic acid | 0.25 | 0.103 |
| Example 3 | 200AF | 20 | solvothermal treatment | decylphosphonic acid | 0.25 | 0.103 |
| Example 4 | FAN-f30 | 30 | solvothermal treatment | decylphosphonic acid | 0.25 | 3.27 |
| Example 5 | FAN-f50j | 50 | solvothermal treatment | decylphosphonic acid | 0.25 | 3.27 |
| Example 6 | FAN-f30 | 30 | solvothermal treatment | decylphosphonic acid | 0.25 | 0.103 |
| Example 7 | FAN-f50j | 50 | solvothermal treatment | decylphosphonic acid | 0.25 | 0.103 |
| Example 8 | FAN-f50j | 50 | solvothermal treatment | decylphosphonic acid | 0.05 | 0.103 |
| Example 9 | FAN-f50j | 50 | solvothermal treatment | decylphosphonic acid | 0.15 | 0.103 |
| Example 10 | FAN-f50j | 50 | solvothermal treatment | decylphosphonic acid | 0.10 | 0.103 |
| Example 11 | FAN-f50j | 50 | solvothermal treatment | decylphosphonic acid | 0.25 | 3.27 |
| Example 12 | FAN-f50j | 50 | solvothermal treatment | octadecylphosphonic acid | 0.25 | 3.27 |
| Example 13 | FAN-f50j | 50 | solvothermal treatment | octadecylphosphonic acid | 0.25 | 0.103 |
| Example 14 | FAN-f50j | 50 | solvothermal treatment | organic compound represented by formula (3) | 0.25 | 0.103 |
| Example 15 | FAN-f50j | 50 | solvothermal treatment | decylphosphonic acid | 0.25 | 0.103 |
| Example 16 | FAN-f05 | 5 | solvothermal treatment | decylphosphonic acid | 0.25 | 0.103 |

| | Surface Treatment Treatment Method | | | | Evaluation of Water Resistance | | | |
|---|---|---|---|---|---|---|---|---|
| | Heating Conditions | | | Number of Washings | | | | Evaluation by Electric Conductivity |
| | | | | First Washing Step | Second Washing Step | Evaluation by pH | | Electric Conductivity |
| | Temperature | Pressure | Time | Washing Step | Ion-Exchanged | | | |
| | °C. | MPa | min | Ethanol | Water | pH | Rating | μS/cm | Rating |
| Example 1 | 300 | 5.0 | 10 | 3 times | 3 times | 8.56 | A | 55.4 | A |
| Example 2 | 300 | 5.0 | 10 | 3 times | 3 times | 8.63 | A | 64.5 | A |
| Example 3 | 300 | 5.0 | 10 | 3 times | 3 times | 7.47 | AA | 51.8 | A |
| Example 4 | 300 | 30 | 10 | 3 times | — | 8.19 | A | 45.5 | AA |
| Example 5 | 300 | 30 | 10 | 3 times | — | 8.88 | A | 78.6 | A |
| Example 6 | 300 | 5.0 | 10 | 3 times | 3 times | 6.94 | AA | 77.1 | A |
| Example 7 | 300 | 5.0 | 10 | 3 times | 3 times | 5.83 | A | 38.8 | AA |
| Example 8 | 300 | 5.0 | 10 | 3 times | 3 times | 8.67 | A | 96.8 | A |
| Example 9 | 300 | 5.0 | 10 | 3 times | 3 times | 7.35 | AA | 28.9 | AA |
| Example 10 | 300 | 5.0 | 10 | 3 times | 3 times | 6.78 | AA | 47.8 | AA |
| Example 11 | 300 | 30 | 10 | 3 times | 3 times | 7.42 | AA | 35.2 | AA |
| Example 12 | 300 | 30 | 10 | 3 times | 3 times | 7.81 | AA | 28.9 | AA |
| Example 13 | 300 | 5.0 | 10 | 3 times | 3 times | 7.39 | AA | 45.8 | AA |
| Example 14 | 300 | 5.0 | 10 | 3 times | 3 times | 7.77 | AA | 26.2 | AA |
| Example 15 | 200 | 1.6 | 10 | 3 times | 3 times | 8.97 | A | 78.7 | A |
| Example 16 | 300 | 5.0 | 10 | 3 times | 3 times | 7.17 | AA | 189.1 | B |

*Amount relative to 1 g of aluminum nitride (AlN) powder before surface treatment.

[Chem. 4]

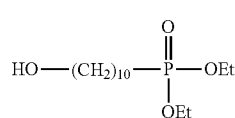

(3)

Reference Example 1

The electric conductivity and pH of the ion-exchanged water itself were measured as Reference Example 1.

Reference Example 2

Extraction-treated ion-exchanged water obtained by subjecting ion-exchanged water to "(1) Preparation of Sample" in "(Evaluation of Water Resistance)" without aluminum nitride powder was measured as Reference Example 2.

Reference Example 3

Boron nitride (BN) (trade name: HP-40(BN)) was subjected to the water resistance evaluation test, in place of aluminum nitride powder.

TABLE 2

| | | Evaluation of Water Resistance | | | |
| --- | --- | --- | --- | --- | --- |
| | | Evaluation by pH | | Evaluation by Electric Conductivity | |
| | | pH | Rating | μS/cm | Rating |
| Reference Example 1 | Ion-exchanged water | 7.01 | AA | 0.6 | AA |
| Reference | Extraction-treated | 6.73 | AA | 0.9 | AA |

TABLE 2-continued

| | | Evaluation of Water Resistance | | | |
| --- | --- | --- | --- | --- | --- |
| | | Evaluation by pH | | Evaluation by Electric Conductivity | |
| | | pH | Rating | μS/cm | Rating |
| Example 2 Reference Example 3 | ion-exchanged water HP-40(BN) | 8.15 | A | 54.3 | A |

Comparative Examples 1 to 7

Aluminum nitride powders (without surface treatment) shown in Table 3 below were subjected to the water resistance evaluation test as aluminum nitride powders of Comparative Examples 1 to 7.

TABLE 3

| | Aluminum Nitride Powder | | Evaluation of Water Resistance | | | |
| --- | --- | --- | --- | --- | --- | --- |
| | Article Number | Average Particle Diameter μm | Surface Treatment Method | Evaluation by pH | | Evaluation by Electric Conductivity | |
| | | | | pH | Rating | μS/cm | Rating |
| Comparative Example 1 | FAN-f05 | 5 | untreated | 11.58 | C | 1128 | C |
| Comparative Example 2 | FAN-f30 | 30 | untreated | 11.19 | C | 652 | C |
| Comparative Example 3 | FAN-f50j | 50 | untreated | 11.14 | C | 580 | C |
| Comparative Example 4 | FAN-f80 | 80 | untreated | 11.33 | C | 759 | C |
| Comparative Example 5 | 050AF | 5 | untreated | 11.42 | C | 976 | C |
| Comparative Example 6 | 100AF | 10 | untreated | 11.47 | C | 968 | C |
| Comparative Example 7 | 200AF | 20 | untreated | 11.43 | C | 878 | C |

Comparative Examples 8 to 20

Surface-treated aluminum nitride powders were obtained in the same manner as in Examples except for surface-treating the aluminum nitride powder under the conditions shown in Table 4 below, and the surface-treated aluminum nitride powders were subjected to the water resistance evaluation test.

TABLE 4

| | Aluminum Nitride Powder | | Surface Treatment | | | |
| --- | --- | --- | --- | --- | --- | --- |
| | | | | Formulation | | |
| | | | | Surface Treating Agent | | Ion-exchanged water |
| | Article Number | Average Particle Diameter μm | Method | Kind | Amount* g/1 g-AlN | Amount* g/1 g-AlN |
| Comparative Example 8 | FAN-f50j | 50 | solvothermal treatment | decanoic acid | 0.25 | 0.103 |

TABLE 4-continued

| | | | | | | |
|---|---|---|---|---|---|---|
| Comparative Example 9 | FAN-f50j | 50 | solvothermal treatment | decylamine | 0.25 | 0.103 |
| Comparative Example 10 | FAN-f50j | 50 | solvothermal treatment | decanol | 0.25 | 0.103 |
| Comparative Example 11 | FAN-f50j | 50 | solvothermal treatment | sodium dodecylsulfate | 0.25 | 0.103 |
| Comparative Example 12 | FAN-f50j | 50 | solvothermal treatment | sodium dodecylsulfate | 0.25 | 3.27 |
| Comparative Example 13 | FAN-f50j | 50 | solvothermal treatment | phenylphosphonic acid | 0.25 | 0.103 |
| Comparative Example 14 | FAN-f50j | 50 | solvothermal treatment | diethyl methylphosphonate | 0.25 | 0.103 |
| Comparative Example 15 | FAN-f50j | 50 | solvothermal treatment | aq. ethylphosphonic acid | 0.36 | 0.103 |
| Comparative Example 16 | FAN-f50j | 50 | solvothermal treatment | diethyl octylphosphonate | 0.25 | 0.103 |
| Comparative Example 17 | FAN-f50j | 50 | solvothermal treatment | — | — | 0.103 |
| Comparative Example 18 | FAN-f50j | 50 | solvothermal treatment | JP-508*[2] | 0.25 | 0.103 |
| Comparative Example 19 | FAN-f50j | 50 | solvothermal treatment | aqueous 1% phosphoric acid solution | 0.103 | — |
| Comparative Example 20 | FAN-f50j | 50 | solvothermal treatment | aqueous 1% phosphoric acid solution | 3.52 | — |

| | Surface Treatment Treatment Method | | | | | Evaluation of Water Resistance | | | |
|---|---|---|---|---|---|---|---|---|---|
| | Heating Conditions | | | Number of Washings | | Evaluation by pH | | Evaluation by Electric Conductivity | |
| | | | | First Washing Step | Second Washing Step | | | | |
| | Temperature ° C. | Pressure MPa | Time min | Ethanol | Ion-Exchanged Water | pH | Rating | Electric Conductivity μS/cm | Rating |
| Comparative Example 8 | 300 | 5.0 | 10 | 3 times | 3 times | 11.02 | C | 628 | C |
| Comparative Example 9 | 300 | 5.0 | 10 | 3 times | 3 times | 11.01 | C | 560 | C |
| Comparative Example 10 | 300 | 5.0 | 10 | 3 times | 3 times | 11.13 | C | 652 | C |
| Comparative Example 11 | 300 | 5.0 | 10 | 3 times | 3 times | 11.09 | C | 759 | C |
| Comparative Example 12 | 300 | 30 | 10 | 3 times | 3 times | 9.72 | C | 371 | C |
| Comparative Example 13 | 300 | 5.0 | 10 | 3 times | 3 times | 6.86 | AA | 756 | C |
| Comparative Example 14 | 300 | 5.0 | 10 | 3 times | 3 times | 7.66 | AA | 2520 | C |
| Comparative Example 15 | 300 | 5.0 | 10 | 3 times | 3 times | 7.38 | AA | 1409 | C |
| Comparative Example 16 | 300 | 5.0 | 10 | 3 times | 3 times | 10.83 | C | 538 | C |
| Comparative Example 17 | 300 | 5.0 | 10 | 3 times | 3 times | 11.15 | C | 523 | C |
| Comparative Example 18 | 300 | 5.0 | 10 | 3 times | 3 times | 6.26 | AA | 465 | C |
| Comparative Example 19 | 300 | 5.0 | 10 | 3 times | 3 times | 10.71 | C | 365 | C |
| Comparative Example 20 | 300 | 30 | 10 | 3 times | 3 times | 9.97 | C | 447 | C |

*Amount relative to 1 g of aluminum nitride (AlN) powder before surface treatment

*[2]JP-508 is the trade name of 2-ethylhexyl acid phosphate manufactured by Johoku Chemical Co., Ltd.

Example 17

A surface-treated aluminum nitride powder was obtained in the same manner as in other Examples except for surface-treating the aluminum nitride powder under the conditions shown in Table 5 below, and the surface-treated aluminum nitride powder was subjected to the water resistance evaluation test.

Thereafter, the precipitate was heated at 120° C. for one hour to remove ethanol, whereby a surface-treated aluminum nitride powder was obtained.

Comparative Examples 22 and 23

An aluminum nitride powder, a surface treating agent and ion-exchanged water were put in a 50 mL three-necked flask

TABLE 5

| | Aluminum Nitride Powder | | | Surface Treatment | | | | | |
|---|---|---|---|---|---|---|---|---|---|
| | | | | | Formulation | | | | |
| | | Average Particle | | | Surface Treating Agent | | Solvent 1 | | Ion-Exchanged Water |
| | Article No. | Diameter μm | Method | Kind | | Amount* g/1 g-AlN | Kind | Amount* g/1 g-AlN | Amount* g/1 g-AlN |
| Example 17 | FAN-f50j | 50 | solvothermal treatment | decylphosphonic acid | | 0.25 | methanol | 0.103 | 0.103 |

| | Surface Treatment Treatment Method | | | | | Evaluation of Water Resistance | | | |
|---|---|---|---|---|---|---|---|---|---|
| | | | | | Number of Washings | | | Evaluation by | |
| | | | | | | Second | | Electric Conductivity | |
| | Heating Conditions | | | First | Washing Step | Evaluation by | | Electric | |
| | Temperature | Pressure | Time | Washing Step | Ion-Exchanged | pH | | Conductivity | |
| | ° C. | MPa | min | Ethanol | Water | pH | Rating | μS/cm | Rating |
| Example 17 | 300 | 10 | 10 | 3 times | 3 times | 6.97 | AA | 29.0 | AA |

*Amount relative to 1 g of aluminum nitride (AlN) powder before surface treatment

Comparative Example 21

An aluminum nitride powder, a surface treating agent and ion-exchanged water were put in a 50 mL three-necked flask in the blending ratio shown in Table 6 below, using the surface treating agent shown in Table 6 below and placing a stirring bar in the three-necked flask.

A condenser tube was connected to the three-necked flask, and the three-necked flask was sealed with a rubber stopper.

A process of evacuating the inside of the three-necked flask into vacuum and feeding nitrogen into the three-necked flask was repeated three times to replace the air in the three-necked flask with nitrogen.

Subsequently, 2-propanol was charged into the three-necked flask in the blending ratio shown in Table 6, and while stirring and mixing the contents in the three-neck flask by means of the stirring bar, the flask was put in a hot-water bath at the temperature shown in Table 6 and heated for a predetermined time.

Furthermore, about 10 mL of ethanol (10 mL of ethanol, relative to 1 g of the raw material powder) was added to the three-necked flask, and the contents in the high-pressure reactor were transferred to a centrifuge tube. After setting the centrifuge tube in a centrifuge (trade name: MX-301, manufactured by Tomy Seiko Co., Ltd.), the contents were centrifuged at 5,000 G for 10 minutes, thereby being separated into a precipitate (reaction product) and a supernatant, and the supernatant was removed from the centrifuge tube.

Next, an ethanol washing step was repeated the number of times shown in Table 6.

in a blending ratio shown in Table 6 below, using the surface treating agent shown in Table 6 below and placing a stirring bar in the three-necked flask.

A condenser tube was connected to the three-necked flask, and the three-necked flask was sealed with a rubber stopper.

A process of evacuating the inside of the three-necked flask into vacuum and feeding nitrogen into the three-necked flask was repeated three times to replace the air in the three-necked flask with nitrogen.

Subsequently, 2-propanol was charged into the three-necked flask in the blending ratio shown in Table 6, and the contents in the three-neck flask were stirred and mixed by means of the stirring bar at room temperature for a predetermined time.

Furthermore, about 10 mL of ethanol (10 mL of ethanol, relative to 1 g of the raw material powder) was added to the three-necked flask, and the contents in the high-pressure reactor were transferred to a centrifuge tube. After setting the centrifuge tube in a centrifuge (trade name: MX-301, manufactured by Tomy Seiko Co., Ltd.), the contents were centrifuged at 5,000 G for 10 minutes, thereby being separated into a precipitate (reaction product) and a supernatant, and the supernatant was removed from the centrifuge tube.

Next, an ethanol washing step was repeated the number of times shown in Table 6.

Thereafter, the precipitate was heated at 120° C. for one hour to remove ethanol, and the residue was annealed at the temperature shown in Table 6 to obtain a surface-treated aluminum nitride powder.

TABLE 6

| | Aluminum Nitride Powder | | Surface Treatment | | | |
|---|---|---|---|---|---|---|
| | | | | Formulation | | |
| | | Average Particle | | Surface Treating Agent | | 2-Propanol |
| | Article Number | Diameter μm | Method | Kind | Amount* g/1 g-AlN | Amount* g/1 g-AlN |
| Comparative Example 21 | FAN-f05 | 5 | boiling of organic solvent | KBM403*[2]/acetic acid/water | 0.075/0.075/0.75 | 12.50 |
| Comparative Example 22 | FAN-f05 | 5 | mixing in organic solvent-firing | KBM403*[2] | 0.075 | 12.50 |
| Comparative Example 23 | FAN-f05 | 5 | mixing in organic solvent-firing | KBM403*[2]/acetic acid/water | 0.075/0.075/0.75 | 12.50 |

| | Surface Treatment | | | | | Evaluation of Water Resistance | | | |
|---|---|---|---|---|---|---|---|---|---|
| | Treatment Method | | | | | | | Evaluation by | |
| | | | Number of Washings | Annealing | | Evaluation by | | Electric Conductivity | |
| | Heating Conditions | | Ethanol | | | pH | | Electric Conductivity | |
| | Temperature °C. | Time Atmosphere min | Washing Step | Temperature °C. | Time hr | pH | Rating | μS/cm | Rating |
| Comparative Example 21 | 80 | nitrogen 1200 | 3 times | — | — | 11.47 | C | 1460 | C |
| Comparative Example 22 | room temperature | nitrogen 60 | 3 times | 700 | 3 | 11.64 | C | 930 | C |
| Comparative Example 23 | room temperature | nitrogen 60 | 3 times | 200 | 3 | 11.57 | C | 1092 | C |

*Amount relative to 1 g of aluminum nitride (AlN) powder before surface treatment
*[2]KBM403 is the trade name of a silane coupling agent (3-glycidoxypropyltrimethoxysilane) produced by Shin-Etsu Chemical Co., Ltd.

Examples 18 to 20

Surface-treated aluminum nitride powders were obtained in the same manner as in other Examples except for surface-treating the aluminum nitride powder by using two kinds of surface treating agents under the conditions shown in Table 7 below, and the surface-treated aluminum nitride powders were subjected to the water resistance evaluation test.

TABLE 7

| | Aluminum Nitride Powder | | Surface Treatment | | | | | |
|---|---|---|---|---|---|---|---|---|
| | | | | Formulation | | | | |
| | | Average Particle | | Surface Treating Agent 1 | | Surface Treating Agent 2 | | Ion-Exchanged Water |
| | Article Number | Diameter μm | Method | Kind | Amount* g/1 g-AlN | Kind | Amount* g/1 g-AlN | Amount* g/1 g-AlN |
| Example 18 | FAN-f50j | 50 | solvothermal treatment | decylphosphonic acid | 0.125 | octadecylphosphonic acid | 0.125 | 0.103 |
| Example 19 | FAN-f50j | 50 | solvothermal treatment | organic compound represented by formula (4) | 0.050 | decylphosphonic acid | 0.200 | 0.103 |

TABLE 7-continued

| | | | | | | | | |
|---|---|---|---|---|---|---|---|---|
| Example 20 | FAN-f50j | 50 | solvothermal treatment | phenylphosphonic acid | 0.125 | decylphosphonic acid | 0.125 | 0.103 |

| | Surface Treatment Treatment Method | | | | | Evaluation of Water Resistance | | | |
|---|---|---|---|---|---|---|---|---|---|
| | Heating Conditions | | | Number of Washings | | | | Evaluation by Electric Conductivity | |
| | | | | First Washing Step | Second Washing Step Ion-Exchanged | Evaluation by pH | | Electric Conductivity | |
| | Temperature | Pressure | Time | | | | | | |
| | °C. | MPa | min | Ethanol | Water | pH | Rating | μS/cm | Rating |
| Example 18 | 300 | 5.0 | 10 | 3 times | 3 times | 7.21 | AA | 33.8 | AA |
| Example 19 | 300 | 5.0 | 10 | 3 times | 3 times | 6.67 | AA | 28.9 | AA |
| Example 20 | 300 | 5.0 | 10 | 3 times | 3 times | 6.17 | AA | 187.4 | B |

*Amount relative to 1 g of aluminum nitride (AlN) powder before surface treatment

[Chem. 5]

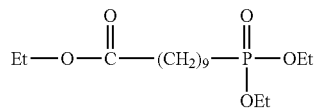

(4)

Example 21

A surface-treated aluminum nitride powder was obtained in the same manner as in other Examples except for surface-treating a large amount (100 g) of aluminum nitride (in other Examples, 1 g) in a potable reactor (volume: 500 mL) (Model TPR-1 manufactured by TAIATSU TECHNO) under the conditions shown in Table 8 below, and the surface-treated aluminum nitride powder was subjected to the water resistance evaluation test.

Since a large amount of aluminum nitride was surface-treated, when the inside of the portable reactor was heated, it took 100 minutes for the inside to reach 300° C. from normal temperature (25° C.) (in other Examples, about 5 minutes). In addition, after the inside was heated at 300° C. for 30 minutes and then heating was stopped, it took 200 minutes to cool the inside of the portable reactor to normal temperature (25° C.) in the state of the portable reactor being placed under normal temperature and normal pressure (25° C., 1 atm.) conditions.

TABLE 8

| | Aluminum Nitride Powder | | | Surface Treatment | | | |
|---|---|---|---|---|---|---|---|
| | | | | | Formulation | | |
| | Article Number | Average Particle Diameter μm | Method | Surface Treating Agent 1 | | | Ion-Exchanged Water |
| | | | | Kind | Amount* g/1 g-AlN | | Amount g/1 g-AlN |
| Example 21 | FAN-f50j | 50 | solvothermal treatment | decylphosphonic acid | 0.100 | | 0.103 |

| | Surface Treatment Treatment Method | | | | | | | Evaluation of Water Resistance | | | |
|---|---|---|---|---|---|---|---|---|---|---|---|
| | Heating Conditions | | | | | Number of Washings | | | | Evaluation by Electric Conductivity | |
| | | | | | | First Washing Step | Second Washing Step Ion-Exchanged | Evaluation by pH | | Electric Conductivity | |
| | Temperature | Pressure | Temperature Rise Time | Reaction Time | Cooling Time | | | | | | |
| | °C. | MPa | min | min | min | Ethanol | Water | pH | Rating | μS/cm | Rating |
| Example 21 | 300 | 2.2 | 100 | 30 | 200 | 3 times | 3 times | 6.88 | AA | 82.4 | A |

*Amount relative to 1 g of aluminum nitride (AlN) powder before surface treatment.

With respect to the aluminum nitride powders of Examples 1 to 21 which are within the scope of the present invention, in the water resistance evaluation test, the pH was close to 7.0 and the electric conductivity was low, as compared with the aluminum nitride powders of Comparative Examples 1 to 23.

It is understood from these results that according to the present invention, an aluminum nitride powder excellent in the water resistance can be provided.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2014-041602) filed on Mar. 4, 2014, the entirety of which is incorporated herein by way of reference.

The invention claimed is:

1. A surface-treated aluminum nitride powder comprising an aluminum nitride powder subjected to a surface treatment with an organic compound represented by the following formula (1):

[Chem. 1]

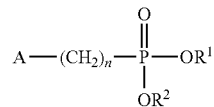
(1)

in which A is a hydrogen atom, a hydroxy group or an ester group, n is an integer of 9 or more, $R^1$ is an alkyl group or a hydrogen atom, and $R^2$ is an alkyl group or a hydrogen atom.

2. The surface-treated aluminum nitride powder according to claim 1, wherein n is an integer of 9 to 18.

3. The surface-treated aluminum nitride powder according to claim 1, wherein the surface treatment is a solvothermal treatment.

4. A resin composition comprising: the surface-treated aluminum nitride powder according to claim 1; and a resin.

5. A thermal conductive molded article obtained by molding the resin composition according to claim 4.

6. The thermal conductive molded article according to claim 5, which is molded into a sheet shape.

* * * * *